US012153132B2

(12) United States Patent
Badeau et al.

(10) Patent No.: US 12,153,132 B2
(45) Date of Patent: Nov. 26, 2024

(54) TECHNIQUES TO RECONSTRUCT DATA FROM ACOUSTICALLY CONSTRUCTED IMAGES USING MACHINE LEARNING

(71) Applicant: Evident Canada, Inc., Québec (CA)

(72) Inventors: Nicolas Badeau, Quebec (CA); Guy Prefontaine, Shannon (CA); Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 243 days.

(21) Appl. No.: 17/447,477

(22) Filed: Sep. 13, 2021

(65) Prior Publication Data

US 2022/0163665 A1    May 26, 2022

Related U.S. Application Data

(60) Provisional application No. 63/117,730, filed on Nov. 24, 2020.

(51) Int. Cl.
*G01S 15/89* (2006.01)
*G06N 20/00* (2019.01)

(52) U.S. Cl.
CPC ...... *G01S 15/8993* (2013.01); *G01S 15/8977* (2013.01); *G01S 15/8997* (2013.01); *G06N 20/00* (2019.01)

(58) Field of Classification Search
CPC ............ G01S 15/8993; G01S 15/8997; G01S 15/8977; G06N 20/00
See application file for complete search history.

(56) References Cited

U.S. PATENT DOCUMENTS

| | | | | |
|---|---|---|---|---|
| 9,986,969 | B2 * | 6/2018 | Call | G01S 15/8927 |
| 2020/0151513 | A1 * | 5/2020 | Lee | G06V 10/764 |
| 2020/0345330 | A1 * | 11/2020 | Zhang | G06T 7/0012 |

OTHER PUBLICATIONS

Song and Yang. ("Super-resolution visualization of subwavelength defects via deep learning-enhanced ultrasonic beamforming: A proof-of-principle study." NDT & E International 116 (2020)) (Year: 2020).*
Virkkunen et al. ("Augmented Ultrasonic Data for Machine Learning. (2010)." (2019)) (Year: 2019).*
Yang et al.("A novel acoustic emission sources localization and identification method in metallic plates based on stacked denoising autoencoders." IEEE Access 8 (2020)) (Year: 2020).*
Hoyle et al. ("Virtual source aperture imaging with auto-focusing of unknown complex geometry through dual layered media." NDT & E International 98 (2018)) (Year: 2018).*
(Continued)

*Primary Examiner* — Luke D Ratcliffe
*Assistant Examiner* — Christopher Richard Walker
(74) *Attorney, Agent, or Firm* — Schwegman Lundberg & Woessner, P.A.

(57) ABSTRACT

Acoustic data, such as a full matrix capture (FMC) matrix, can be reconstructed by applying a previously trained decoder machine learning model to one or more encoded acoustic images, such as the TFM image(s), to generate reconstructed acoustic data. A processor can use the reconstructed acoustic data, such as an FMC matrix, to recreate new encoded acoustic images, such as TFM image(s), using different generation parameters (e.g., acoustic velocity, part thickness, acoustic mode, etc.).

18 Claims, 8 Drawing Sheets

(56) References Cited

OTHER PUBLICATIONS

Vogt et al. ("Synthetic aperture focusing technique for high-resolution imaging of surface structures with high-frequency ultrasound," 2009 IEEE International Ultrasonics Symposium, Rome, Italy, 2009, pp. 1514-1517) (Year: 2009).*

Munir et al. ("Performance enhancement of convolutional neural network for ultrasonic flaw classification by adopting autoencoder." NDT & E International 111 (2020)) (Year: 2020).*

Ebrahimkhanlou et al. ( "A generalizable deep learning framework for localizing and characterizing acoustic emission sources in riveted metallic panels." Mechanical Systems and Signal Processing 130 (2019)) (Year: 2019).*

Ye et al. ("Computerized ultrasonic imaging inspection: From shallow to deep learning." Sensors 18.11 (2018)) (Year: 2018).*

Holmes, Caroline, et al., "Advanced post-processing for scanned ultrasonic arrays—Application to defect detection and classi?cation in non-destructive evaluation", Ultrasonics 48, (2008), 636-642.

Holmes, Caroline, et al., "Post-processing of the full matrix of ultrasonic transmit-receive array data for non-destructive evaluation", NDT&E International 38, (2005), 701-711.

Nair, Arun, et al., "A Deep Learning Based Alternative to Beamforming Ultrasound Images", ICASSP, (2018), 3359-3363.

* cited by examiner

TECHNIQUES TO RECONSTRUCT DATA FROM ACOUSTICALLY CONSTRUCTED IMAGES USING MACHINE LEARNING

CLAIM OF PRIORITY

This application claims the benefit of priority of U.S. Provisional Patent Application Ser. No. 63/117,730, titled "TECHNIQUES TO RECONSTRUCT DATA FROM ACOUSTICALLY CONSTRUCTED IMAGES USING MACHINE LEARNING" to Nicolas Badeau et al., filed on Nov. 24, 2020, the entire contents of which being incorporated herein by reference.

FIELD OF THE DISCLOSURE

This document pertains generally, but not by way of limitation, to non-destructive evaluation using acoustic techniques.

BACKGROUND

Various techniques can be used to perform inspection of structures in a non-destructive manner. Such techniques can include use of ionizing radiation such as X-rays for inspection, electromagnetic techniques such as eddy-current techniques, or acoustic techniques, as illustrative examples. In one approach, an ultrasonic transducer or an array of such transducers can be used to inspect a structure using acoustic energy. Ultrasonic inspection is useful for inspection of a variety of different structures including bar-shaped or tubular structures, welds, planar (e.g., plate materials), and composite materials such as carbon-fiber reinforced composite structures.

Inhomogeneities on or within the structure under test can generate scattered or reflected acoustic signals in response to a transmitted acoustic pulse. Such acoustic "echoes" can be received and processed. Such processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

SUMMARY OF THE DISCLOSURE

This disclosure is directed to, among other things, techniques in which acoustic data, such as a full matrix capture (FMC) matrix, can be reconstructed by applying a previously trained decoder machine learning model to one or more encoded acoustic images, such as the TFM image(s), to generate reconstructed acoustic data. A processor can use the reconstructed acoustic data, such as an FMC matrix, to recreate new encoded acoustic images, such as TFM image(s), using different generation parameters (e.g., acoustic velocity, part thickness, acoustic mode, etc.)

In some aspects, this disclosure is directed to a computerized method of image processing using processing circuitry to apply a previously trained decoder machine learning model in a system for non-destructive testing (NDT) of a material, the method comprising: obtaining a first encoded acoustic image of an object, wherein the first encoded acoustic image is generated using first acoustic data and at least one generation parameter and at least one inspection parameter; and applying a previously trained decoder machine learning model to the first encoded acoustic image to generate reconstructed first acoustic data.

In some aspects, this disclosure is directed to a computerized method of image processing using image processing circuitry to apply a previously trained decoder machine learning model in a system for non-destructive testing (NDT) of a material, the method comprising: obtaining a first encoded acoustic image of an object, wherein the first encoded acoustic image is generated using first acoustic data and at least one generation parameter and at least one inspection parameter; modifying the at least one generation parameter; and applying a previously trained decoder machine learning model to the first encoded acoustic image to generate a second encoded acoustic image.

In some aspects, this disclosure is directed to a computerized method of image processing using image processing circuitry to apply a previously trained decoder machine learning model in a system for non-destructive testing (NDT) of a material, the method comprising: obtaining a first encoded acoustic image of an object, wherein the first encoded acoustic image is generated using first acoustic data and at least one generation parameter and at least one inspection parameter; downsampling the first acoustic data and storing the downsampled first acoustic data; and applying a previously trained decoder machine learning model to the downsampled first acoustic data and the first encoded acoustic image to generate reconstructed first acoustic data.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
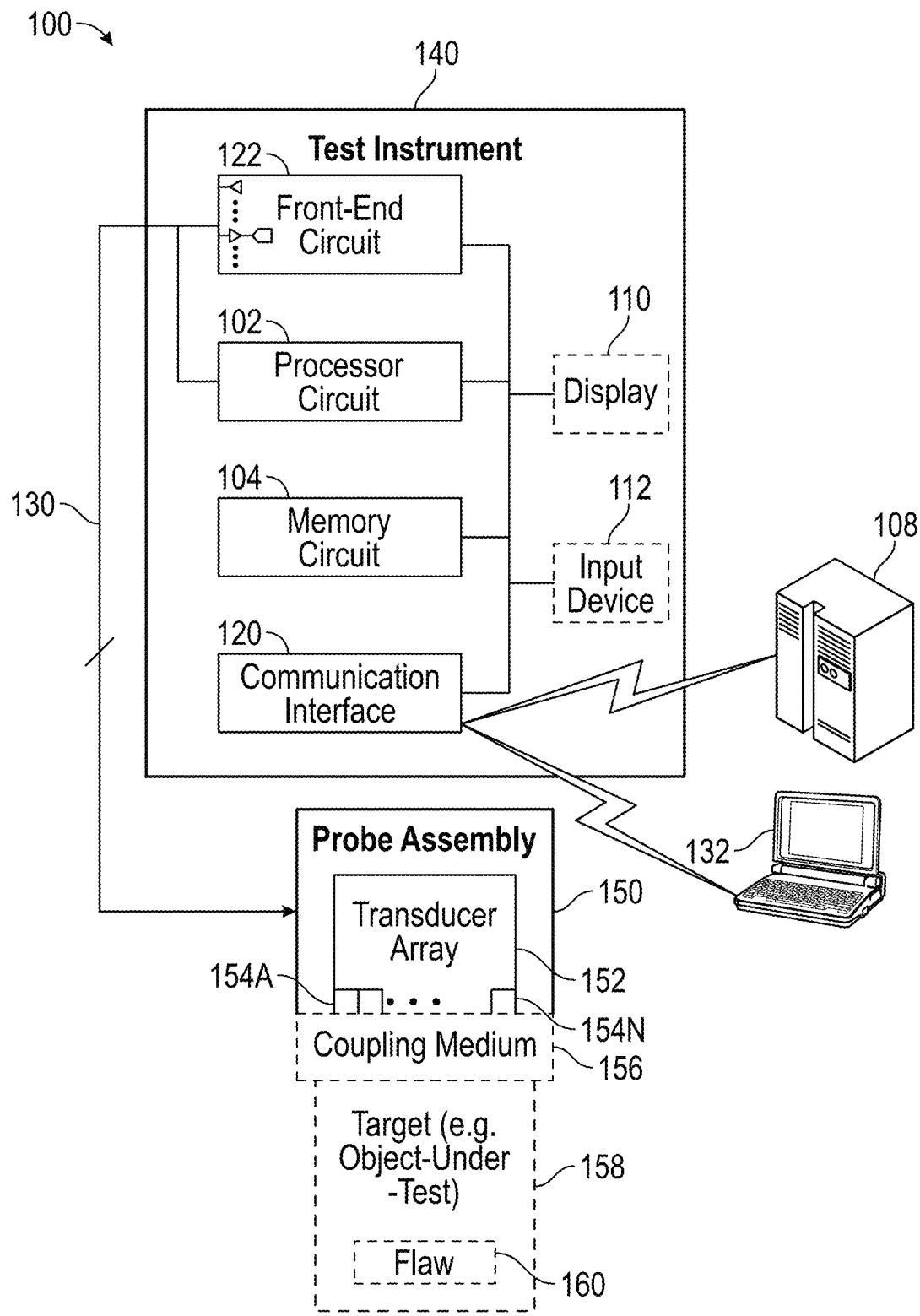
FIG. 1 illustrates generally an example comprising an acoustic inspection system 100, such as can be used to perform one or more techniques described herein.

As mentioned above, acoustic techniques can be used to perform non-destructive testing (sometimes referred to generally as non-destructive evaluation) of structures by coupling acoustic energy onto or within such structures and detecting scattered or reflected energy corresponding to features on or within such structures under test.

The hallmark of ultrasonic phased array is the capacity to focus and steer an acoustic beam at a desired position in an inspected object or part. The phased array focusing approach uses delays, applied on both the transmission and reception elements of the phased array probe, to synchronize the time of flights of short, pulsed waveforms at the position of interest. At the focal zone in the specimen, the width of the generated acoustic beam narrows, and the corresponding detection resolution increases.

Conventional phased array uses the physical superposition of elementary acoustic waves in transmission to produce an acoustic beam aimed at a specific focused depth in the inspected piece. The set of transmitter elements form an aperture from which a coherent acoustic pulse emerges. The action of conventional phased array transmission is referred to as beamforming. In an S-scan, for instance, beamforming acquisition occurs for each user-specified angle.

In one approach, a plurality of acoustic transducers can be used to perform such acoustic inspection. Such a plurality of transducers can be referred to as an "array," but such an array need not be planar or linear in arrangement or orientation and need not have a constant pitch between respective transducer elements.

Processing of received acoustic echo signals to form images can involve various techniques. In one acoustic acquisition approach, respective received acoustic echo signals can be "delayed and summed" to provide focusing within a specific locus on or within the structure under test.

In another approach, an acoustic acquisition technique called a "total focusing method" (TFM) can be used, such as involving a full-matrix capture (FMC) acquisition scheme where focus can be achieved across a broad spatial region on or within a structure under test. TFM also uses a delay-and-sum algorithm. Several TFM propagation modes are available, where the TFM propagation modes represent the path of ultrasound waves from the transmitter to an image pixel in a TFM zone and back to the receiver (including reflections).

The TFM acoustic propagation modes are defined by the types of waves (transverse or longitudinal) for each leg of the path. A pulse-echo mode is any propagation mode where the transmitted beam and the reception beam follow the exact same path in the inspected piece. Pulse-echo modes can be achieved in a direct path with no skips, such as TT, or with multiple skips, e.g., TT-TT. In a self-tandem mode, e.g., TT-T, the transmission and reception propagation paths do not match exactly, but the transmitting and receiving elements are on the same phased array probe. Pulse-echo and self-tandem propagation modes are not specific to the TFM; they can be obtained in a conventional phased array as well as the TFM.

The TFM algorithm is a form of dimensionality reduction, where acoustic data, typically arranged into a full matrix capture (FMC) matrix (typical size is 1024×4000 or greater) are summed using predefined generation parameters to form an image. A typical size of a TFM image can be 1024×1024 pixels or less.

Various generation parameters can be used to generate an image, such as a TFM image. For example, generation parameters can include wedge velocity, wedge angle, wedge first elements height, wedge radius, part velocity, part thickness, and/or the selected acoustic propagation mode(s).

To produce a pixel or voxel in an acoustic image of an object using TFM, for example, a processor can calculate the delays associated with that pixel or voxel using the acoustic data, such as data in an FMC matrix, that was acquired by the acoustic imaging system using one or more of the generation parameters. The processor can determine the amplitude at the particular delay, generate a scattering matrix (hereafter "S-matrix"), and then generate an image of the material being inspected. Each combination element-voxel has an associated delay. These delays can be used to determine the relevant data in the full matrix of acoustic data. The "particular delay" represents the delay needed for a specific combination of elements and pixel/voxel. The S-matrix, once summed by TFM, can be used by the processor to produce a pixel or voxel to generate an image.

As mentioned above, the TFM algorithm is a form of dimensionality reduction, which can be considered an encoding process. A reduced data set can be desirable as an acoustic imaging system can perform an inspection more quickly with smaller data storage. In addition, storing all the original acoustic data, such as the FMC matrix, may not be feasible given its size and the storage capacity of a handheld inspection system, for example. Finally, transmitting all the original acoustic data, such as the FMC matrix, also may not be feasible.

Reconstruction of the original acoustic data, such as the FMC matrix, from a TFM image is not possible using deterministic methods due to the loss of data in the TFM summation process and the lack of an accurate acoustical model. With existing techniques, data such as the elementary A-scans are no longer available due to the dimensionality reduction of the TFM algorithm. The present inventors have recognized the desirability of being able to generate a new TFM image using different generation parameters, such as a different propagation mode, different part velocity, etc.

In accordance with various techniques of this disclosure, the present inventors have recognized that the acoustic data, such as a FMC matrix, can be reconstructed by applying a previously trained decoder machine learning model to one or more encoded acoustic images, such as the TFM image(s), to generate reconstructed acoustic data. A processor can then use the reconstructed acoustic data, such as an FMC matrix, to recreate new encoded acoustic images, such as TFM image(s), using different generation parameters (e.g., acoustic velocity, part thickness, acoustic mode, etc.). For example, if a TFM image is generated and later it was determined that an incorrect part thickness was used as a generation parameter, such as due to a change in a thickness of a weld, a new part thickness can be used along with a reconstructed FMC matrix to produce a new TFM image.

FIG. 1 illustrates generally an example comprising an acoustic inspection system 100, such as can be used to perform one or more techniques described herein. The acoustic inspection system 100 of FIG. 1 is an example of an acoustic imaging modality, such as an acoustic phased array system, that can implement various techniques of this disclosure.

The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various probe assemblies 150. In a non-limiting example, the transducer array 152 can include piezoelectric transducers, such as can be acoustically coupled to a target 158 (e.g., an object under test) through a coupling medium 156. In other examples, capacitive micromachined ultrasonic transducer (CMUT) arrays can be used. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

Although FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a computing facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit 102 can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a computing facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of data or intermediate data such as A-line matrices of time-series data can be accomplished using remote storage facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

The acoustic inspection system 100 can acquire acoustic data, such as using FMC, half matrix capture (HMC), virtual source aperture (VSA), or plane wave imaging, of a material using an acoustic acquisition technique, such as an acoustic phased array system. The processor circuit 102 can then generate an acoustic data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

As described in more detail below, the processor circuit 102 or another processor circuit can obtain a first encoded acoustic image of an object. For example, the first encoded acoustic image can be generated using techniques such as a total focusing method (TFM) technique or using a synthetic aperture focusing technique (SAFT).

To generate an image, an acoustic inspection system, such as the acoustic inspection system 100 of FIG. 1, can use inspection parameters and generation parameters. Inspection parameters need to be known, without regards to the final acoustic image to be generated. Inspection parameters cannot be changed by a previously trained machine learning model and can include the following: A-scan start (time at the first sample data), sample time resolution, frequency of probe, number of element in probe, and other characteristic of the probe such as element size, pitch, and bandwidth.

Generation parameters and many inspection parameters are used to generate an acoustic image from the acoustic data. As described below, a previously trained machine learning model can be used to modify one or more of those generation parameters without having the raw initial acoustic data. Generation parameters can include selected acoustic mode, thickness of part, velocity (velocity of different mode in the inspection {wedge, part}), and a region of interest, (size, position, and/or resolution).

The first encoded acoustic image can be generated using a total focusing method (TFM) technique or using a synthetic aperture focusing technique (SAFT). In SAFT, the transmitted beam is a broad band signal that is sent out in a wide cone of transmission, which can be achieved by a small elevation of the probe elements, such as around half of the wavelength in the wedge of the probe. The broadband nature of the transmitted signal allows direct measurement of the time-of-flight (TOF) or the phase information of the signal, thereby allowing the determination of the range of any reflectors (e.g., changes in acoustical impedance) which cause returning echoes.

The first encoded acoustic image, such as a TFM image, can be generated using at least one generation parameter and first acoustic data, such as FMC data, where the first acoustic data can be acquired at least in part by an acoustic acquisition technique, such as an acoustic phased array system. Then, the processor circuit 102, for example, can apply a previously trained decoder machine learning model to the first encoded acoustic image, such as a TFM image, to generate reconstructed first acoustic data. Training a machine learning model is described below with respect to FIG. 6.

Figure 2:
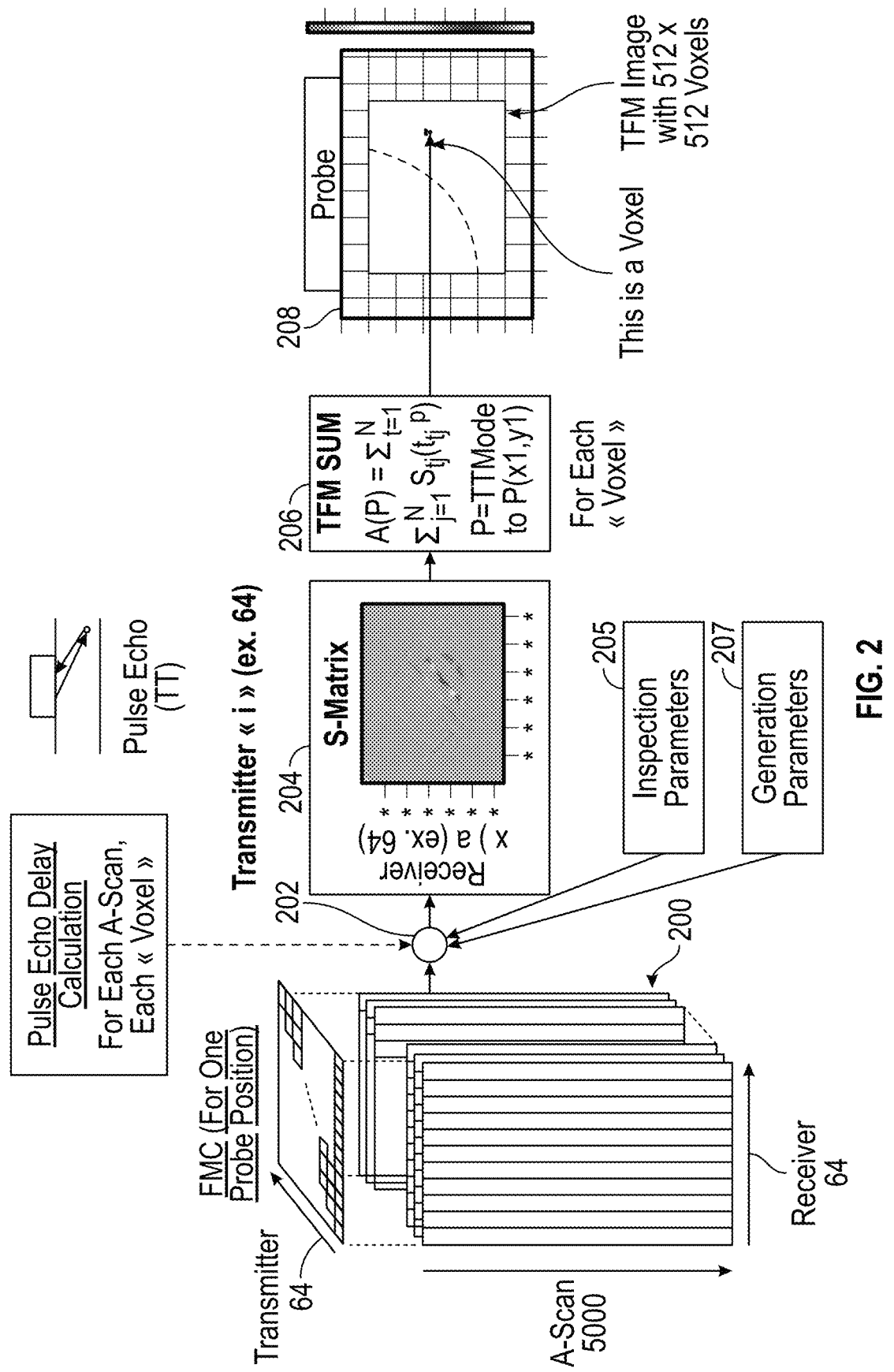
FIG. 2 is a conceptual diagram illustrating a non-limiting example of total focusing method.

FIG. 2 is a conceptual diagram illustrating a non-limiting example of total focusing method. Starting on the left-hand side, an acoustic inspection system, such as the acoustic inspection system 100 of FIG. 1, can include 64 elements, where all elements transmit and then receive, which generates a matrix of A-scans that constitute the FMC data 200. In this non-limiting example, a pulse echo direct (TT) propagation mode was used. In other examples, self-tandem (TT-T), pulse echo with skip (TT-TT), or other propagation modes can be used.

Various inspection parameters 205 and generation parameters 207 can be used to perform the delay calculation at 202, e.g., a pulse echo delay calculation. For example, generation parameters 207 can include wedge velocity, wedge angle, wedge first elements height, wedge radius, part velocity, part thickness, and/or the selected acoustic propagation mode(s). Inspection parameters can include A-scan start (time at the first sample data), sample time resolution, frequency of probe, number of element in probe, and other characteristic of the probe such as element size, pitch, and bandwidth.

A processor circuit, such as the processor circuit 102 of FIG. 1, can calculate a delay for each A-scan and for each pixel or voxel, such as a pulse echo delay, using the inspection parameters 205 and generation parameters 207. The processor circuit can generate an S-matrix data set 204 that includes amplitude information and the corresponding delay data (or phase data) for each pixel or voxel. The processor circuit can perform a TFM summation 206 on the S-matrix data set, where each voxel of the TFM image has a different corresponding S-matrix, and generate a single pixel or voxel in an image 208 of the material under test.

Figure 3A:
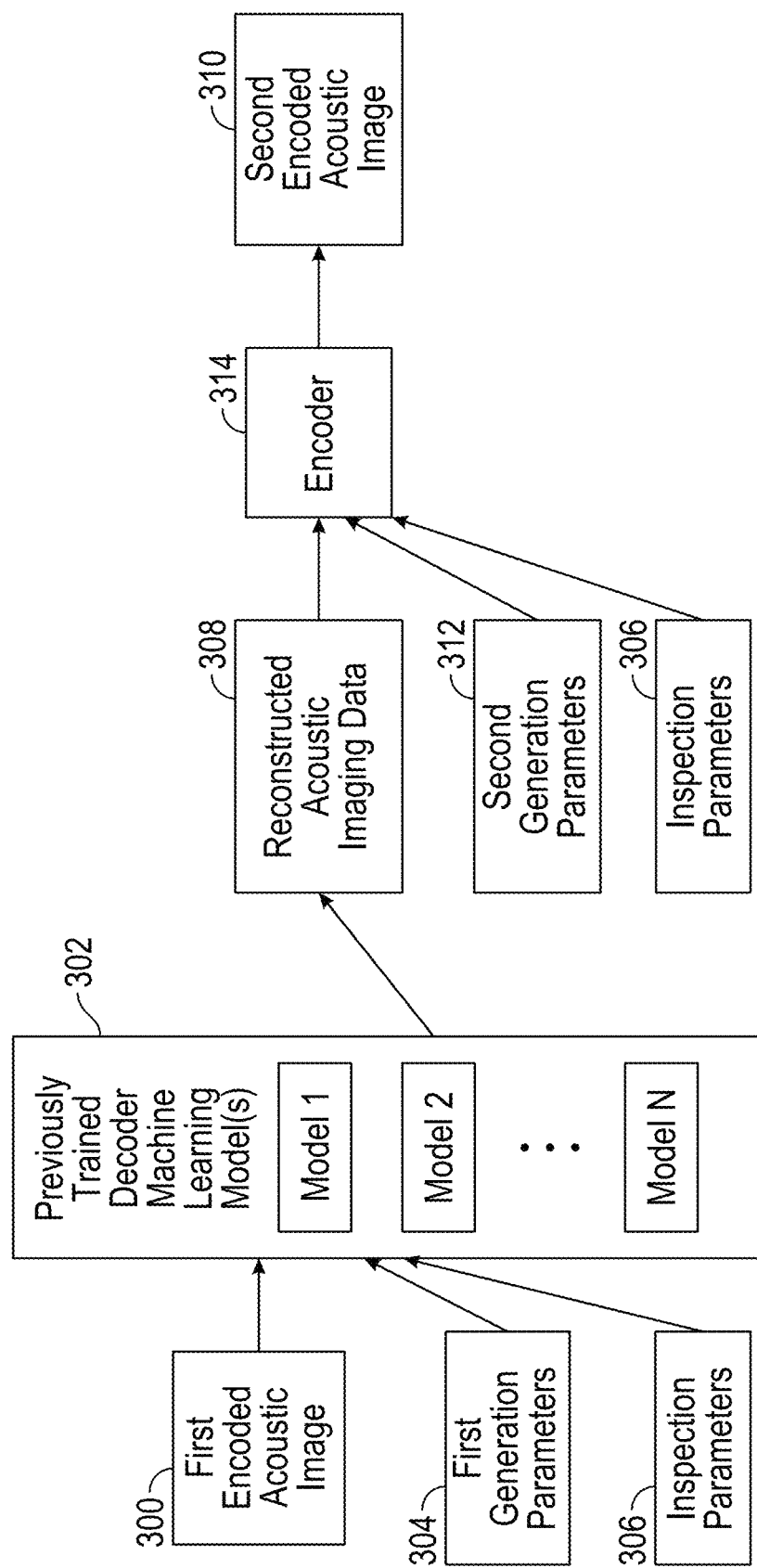
FIG. 3A is a block diagram illustrating a non-limiting example of a computerized method of image processing using processing circuitry to apply a previously trained decoder machine learning model in a system for non-destructive testing (NDT) of a material.

FIG. 3A is a block diagram illustrating a non-limiting example of a computerized method of image processing using processing circuitry to apply a previously trained decoder machine learning model in a system for non-destructive testing (NDT) of a material. Using the techniques of FIG. 3A, a first image can be applied to a decoder to generate reconstructed data to be applied to an encoder, which can generate a new image.

A first encoded acoustic image 300, such as the TFM image 208 of FIG. 2, can be obtained. The obtained first encoded acoustic image 300 can be generated using acoustic data, such as FMC data, one or more inspection parameters, and one or more generation parameters, where the first acoustic data is acquired at least in part by an acoustic acquisition technique, such as an acoustic phased array system.

In some examples, the first encoded acoustic image can be generated using techniques such as a total focusing method (TFM) technique.

In some examples, acoustic acquisition techniques can be performed to obtain the first acoustic data, such as performing full matrix capture techniques, performing virtual source aperture techniques, and the like.

Figure 3B:
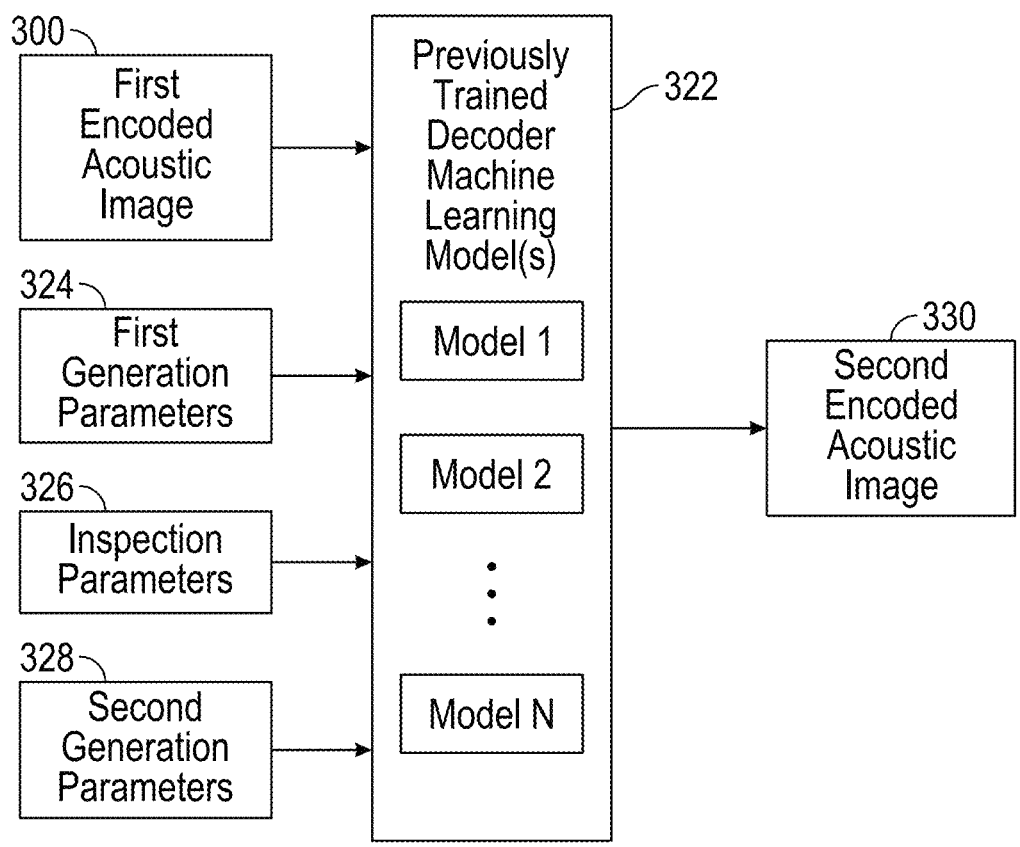
FIG. 3B is a block diagram illustrating another non-limiting example of a computerized method of image processing using processing circuitry to apply a previously trained decoder machine learning model in a system for non-destructive testing (NDT) of a material.

The processor circuit 102 or another processor circuit can apply the first encoded acoustic image 300, the first generation parameters 304, and the inspection parameters 306 to a previously trained decoder machine learning model 302. As shown in FIGS. 3A and 3B, in some examples, the previously trained decoder machine learning model 302 can include a number N models and the processor circuit 102 can select the previously trained decoder machine learning model from amongst the N models using the inspection parameter and the generation parameters. Examples of machine learning models are described in detail below with respect to FIG. 6.

For example, at least some of the number N models can have been trained using different generation parameters and inspection parameters. The encoded acoustic image can then be saved with a unique trained machine learning model, such as one of the models 1-N. In other examples, previously trained decoder machine learning model 302 can include a single model that works for any generation parameters set or other combination of one or more generation parameters.

The processor circuit 102 or another processor circuit can apply the first encoded acoustic image 300, the first generation parameters 304, and the inspection parameters 306 to a previously trained decoder machine learning model 302 to generate reconstructed acoustic data 308.

In accordance with this disclosure, a second encoded acoustic image 310 can be generated by applying the reconstructed acoustic data 308, second (e.g., modified) generation parameters 312, and inspection parameters 306 to an encoder 314, such as the TFM summation encoder 206 of FIG. 2. The encoder 314 (and other encoders in this disclosure) can be trained to compress the reconstructed acoustic imaging data into a second acoustic image. The second encoded acoustic image 310 can be generated one of two ways.

In a first way, starting with the first encoded acoustic image 300, e.g., a TFM image, a previously trained decoder machine learning model 302 can decode the image 300 and generate reconstructed acoustic imaging data 308. Then, the processor circuit 102 can modify one or more generation parameters, such as a propagation mode, and apply the modified generation parameter(s) 312 and the reconstructed first acoustic imaging data 308 to an encoder 314, such as the TFM summation encoder 206 of FIG. 2, to generate a second encoded acoustic image 310 of the object.

In some examples, the processor circuit 102 can modify generation parameters such as one or more of the following: wedge velocity, wedge angle, wedge first elements height, wedge radius, part velocity, part thickness, or selected acoustic propagation mode. For example, if a TFM image is generated and later it was determined that an incorrect part thickness was used as a generation parameter, such as due to a change in a thickness of a weld, a new part thickness can be used along with a reconstructed FMC matrix to produce a new TFM image. In addition, various inspection parameters can be used to generate the first acoustic imaging data, e.g., FMC data, such as a sampling frequency, a number of points, and a data start, which is the time reference of the first sample receiver, relative to the general time zero defined by the acoustic pulse transmission moment. These inspections parameters cannot be modified by the trained decoder.

In some examples, more than one first encoded acoustic image 300 can be used to generate reconstructed acoustic imaging data. For example, the first encoded acoustic image 300 can include three (3) images, such as generated using three (3) acoustic propagation modes from the same acoustic data, e.g., FMC data. For example, acoustic propagation modes such as pulse echo direct (TT), self-tandem (TT-T), and/or pulse echo with skip (TT-TT) can be used.

In some examples, the first acoustic data, e.g., FMC data, can be a volume of data, such as acquired using a matrix probe. Thus, both the first encoded acoustic image 300 and the first acoustic data, such as the data 200 of FIG. 2, can be three-dimensional (3D), which can be used to generate a 3D TFM image.

FIG. 3B is a block diagram illustrating another non-limiting example of a computerized method of image processing using processing circuitry to apply a previously trained decoder machine learning model in a system for non-destructive testing (NDT) of a material. Using the techniques of FIG. 3B, a first image can be applied to a decoder, which can directly generate new image.

A first encoded acoustic image 300, such as the image 208 of FIG. 2, can be obtained. The obtained first encoded acoustic image 300 can be generated using acoustic data, such as FMC data, and one or more generation parameters and one or more inspection parameters, where the first acoustic data is acquired at least in part by an acoustic acquisition technique, such as an acoustic phased array system.

A previously trained decoder machine learning model 322 can include a number N models, where each model is differentiated by a set of different generation parameters. Examples of machine learning models are described in detail below with respect to FIG. 6.

The processor circuit 102 or another processor circuit can apply the first encoded acoustic image 300, the first generation parameters 324, the inspection parameters 326, and second generation parameters 328 to the previously trained decoder machine learning model 302. A specific model of the previously trained decoder machine learning model 322 that was trained using generation parameters corresponding to the second generation parameters 328, e.g., model 2, can decode the image 300 and directly generate a second encoded acoustic image 330 with those different generation parameters.

Figure 4:
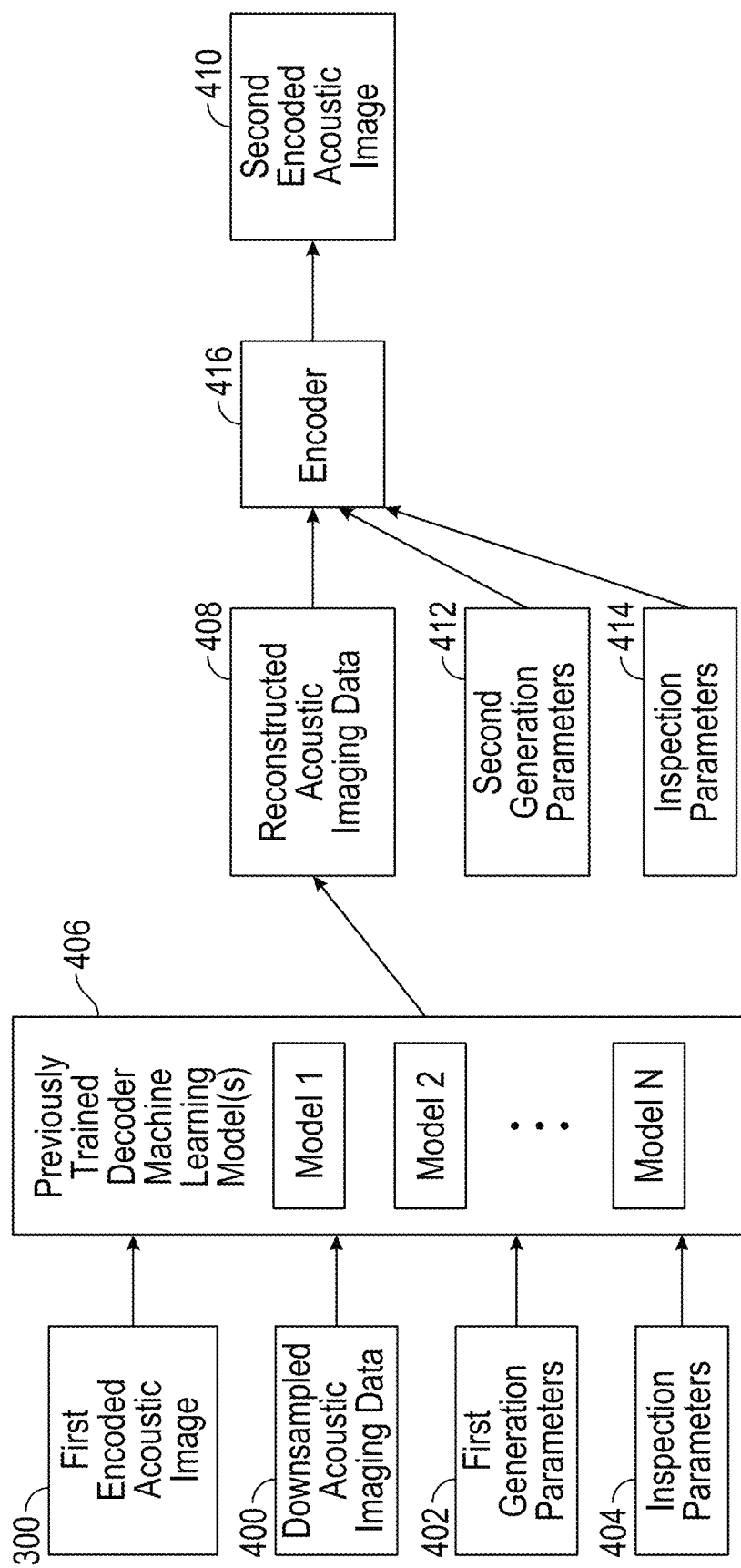
FIG. 4 is a block diagram illustrating another non-limiting example of a computerized method of image processing using processing circuitry to apply a previously trained decoder machine learning model in a system for non-destructive testing (NDT) of a material.

FIG. 4 is a block diagram illustrating another non-limiting example of a computerized method of image processing using processing circuitry to apply a previously trained decoder machine learning model in a system for non-destructive testing (NDT) of a material. Using the techniques of FIG. 4, a first image and downsampled data can be applied to a decoder to generate reconstructed data to be applied to an encoder, which can generate a new image.

The processor circuit 102 or another processor circuit can apply the first encoded acoustic image 300, sparse or down-sampled acoustic imaging data 400, the first generation parameters 402, and the inspection parameters 404 to a previously trained decoder machine learning model 406. Downsampling can include, for example, storing only some of the sample points in the matrix, storing the matrix of phase, or any other treatment that can reduce the size of the FMC matrix with loss of information.

Then, the previously trained decoder machine learning model 406 can generate the reconstructed acoustic imaging data 408. A second encoded acoustic image 410 can be generated by applying the reconstructed acoustic imaging data 408, second (e.g., modified) generation parameters 412, and inspection parameters 414 to an encoder 416, using the techniques described above with respect to FIG. 3A.

By retaining and starting with downsampled acoustic imaging data 400, the trained decoder model 406 can more quickly and precisely generate the reconstructed acoustic imaging data 408, as compared to starting with only an encoded acoustic image, as in FIG. 3A.

In some examples, the downsampled acoustic imaging data 400 can include phase data only, and no amplitude data. For example, the processor circuit 102 can extract the phase data from the signal and save it. The data payload for phase-only data is much smaller than with data that includes amplitude information.

Then, a processor circuit can apply a previously trained decoder machine learning model 406 to the downsampled acoustic imaging data 400 to produce amplitude information and then map the amplitude information to the phase data in order to generate the reconstructed acoustic imaging data 408. From the reconstructed acoustic imaging data 408, a different encoded acoustic image 410 can be generated, using the techniques described above with respect to FIG. 3. In some examples, the encoded acoustic image, such as a TFM image, can also be applied with the downsampled acoustic imaging data 400 to the previously trained decoder machine learning model 406.

In some examples, an acoustic imaging system, such as the acoustic imaging system 100 of FIG. 1 can generate a downsampled, phase-based acoustic imaging data set, such as a phase-based S-matrix corresponding to an acoustic propagation mode, and store the imaging data, which can be used by the model in FIG. 4, for example. In some examples, downsampling and storing the imaging data can include removing the amplitude information of the acoustic imaging data and storing phase information of the acoustic imaging data.

Additional information regarding a phased-based approach to ultrasonic testing can be found in commonly assigned U.S. Provisional Patent Application No. 62/983,172, titled "PHASE-BASED APPROACH FOR ULTRASONIC INSPECTION" to Guillaume Painchaud-April et al., filed on Feb. 28, 2020, the entire contents of which being incorporated herein by reference.

Figure 5:
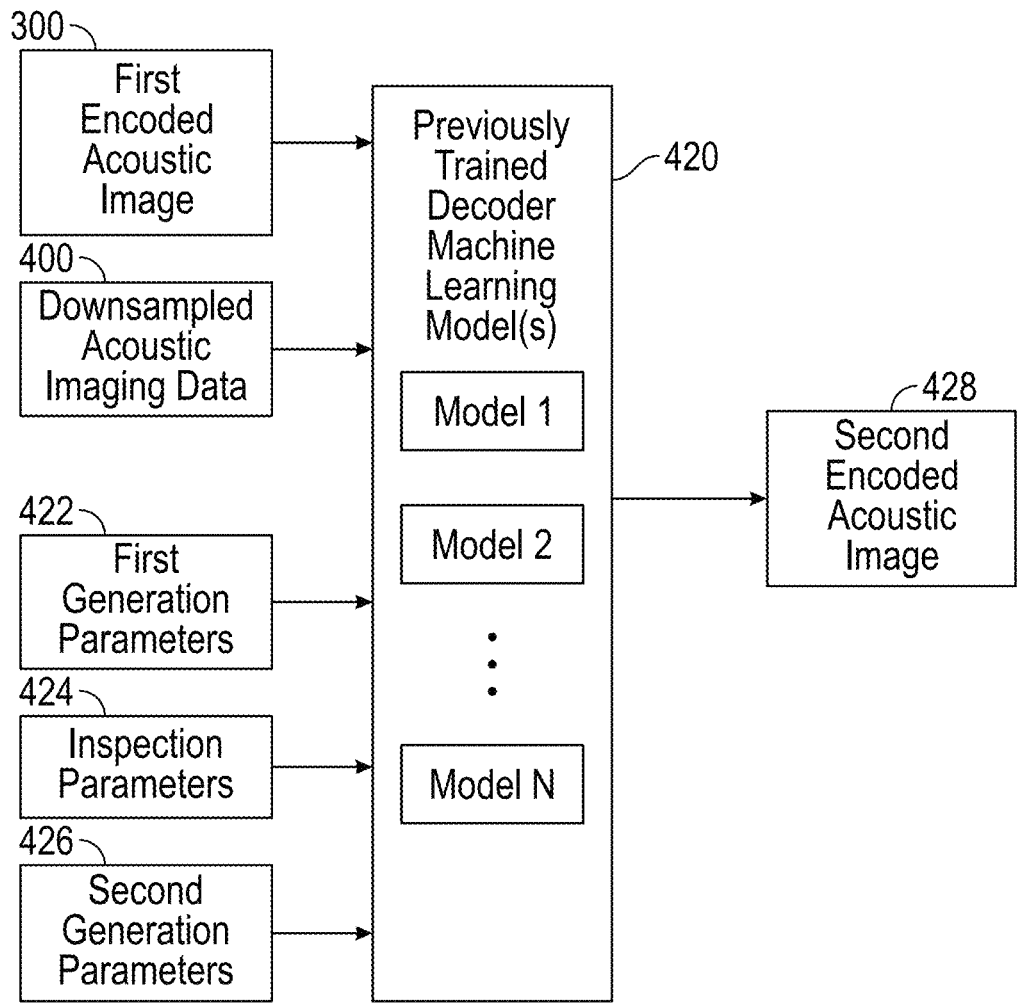
FIG. 5 is a block diagram illustrating another non-limiting example of a computerized method of image processing using processing circuitry to apply a previously trained decoder machine learning model in a system for non-destructive testing (NDT) of a material.

FIG. 5 is a block diagram illustrating another non-limiting example of a computerized method of image processing using processing circuitry to apply a previously trained decoder machine learning model in a system for non-destructive testing (NDT) of a material. Using the techniques of FIG. 5, a first image and downsampled data can be applied to a decoder, which can directly generate a new image.

A first encoded acoustic image 300, such as the image 208 of FIG. 2, can be obtained. The obtained first encoded acoustic image 300 can be generated using acoustic data, such as FMC data, and one or more generation parameters and one or more inspection parameters, where the first acoustic data is acquired at least in part by an acoustic acquisition technique, such as an acoustic phased array system.

A previously trained decoder machine learning model 420 can include a number N models, where each model is differentiated by a set of different generation parameters.

Examples of machine learning models are described in detail below with respect to FIG. 6.

The processor circuit 102 or another processor circuit can apply the first encoded acoustic image 300, sparse or down-sampled acoustic imaging data 400, the first generation parameters 422, the inspection parameters 424, and second generation parameters 426 to the previously trained decoder machine learning model 420. A specific model of the previously trained decoder machine learning model 420 that was trained using generation parameters corresponding to the second generation parameters 426, e.g., model 2, can decode the image 300 and directly generate a second encoded acoustic image 428 with those different generation parameters.

By retaining and starting with downsampled acoustic imaging data 400, the processor circuit 102 can more quickly generate the second encoded acoustic image 410, as compared to starting with an encoded acoustic image, as in FIG. 3A.

In some examples, the downsampled acoustic imaging data 400 can include phase data only, and no amplitude data. For example, the processor circuit 102 can extract the phase data from the signal and save it. The data payload for phase-only data is much smaller than with data that includes amplitude information.

As described above, a previously trained machine learning model can be used to modify one or more of those generation parameters without having the raw initial acoustic data. FIG. 6 describes an example of a process of training a machine learning model to produce a trained machine learning model, such as the previously trained machine learning models 302 (of FIG. 3A), 322 (of FIG. 3B), 406 (of FIGS. 4), and 420 (of FIG. 5).

Figure 6:
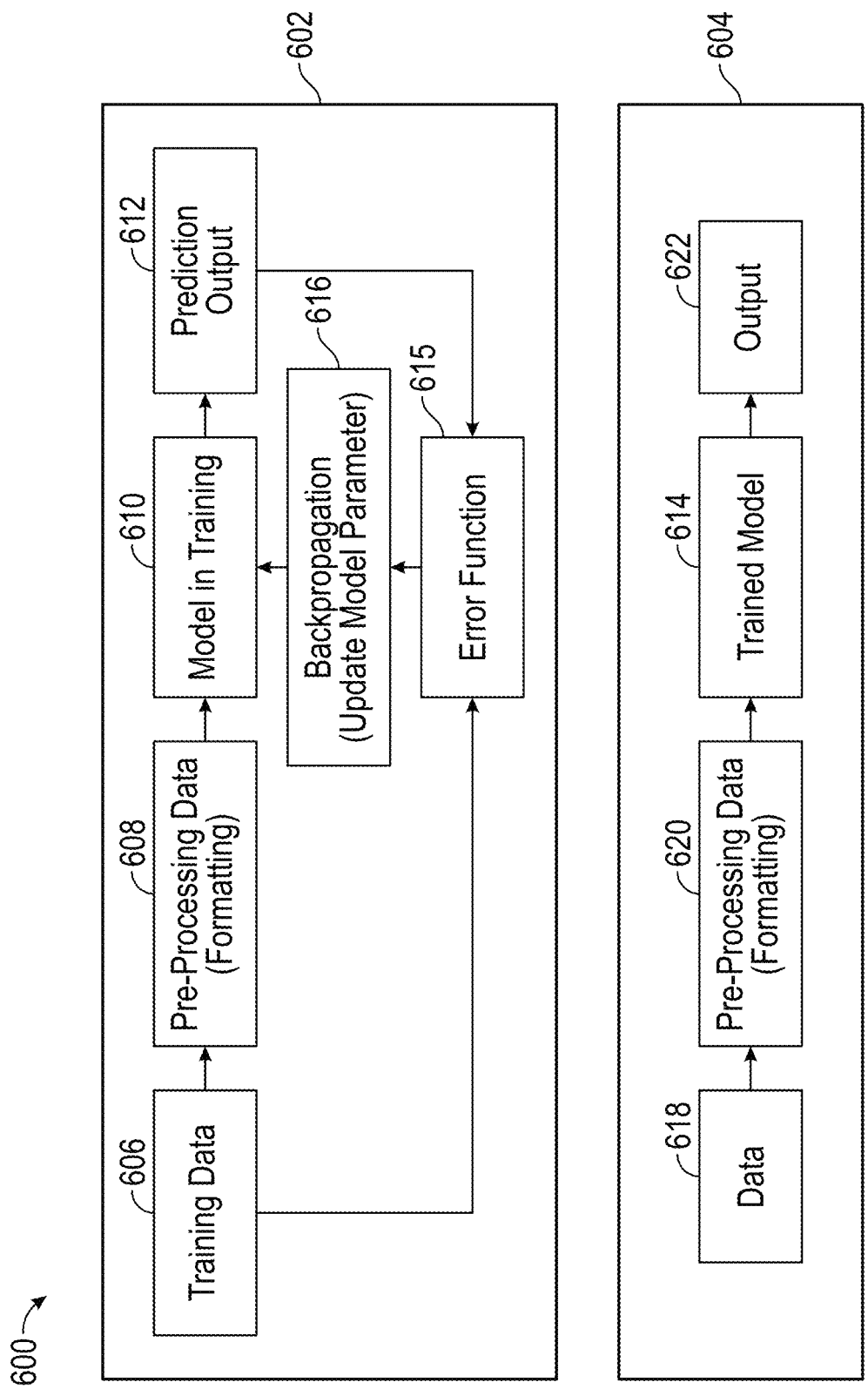
FIG. 6 shows an example of a machine learning module according to some examples of the present disclosure.

FIG. 6 shows an example of a machine learning module 600 according to some examples of the present disclosure. The machine learning module 600 can be implemented in whole or in part by one or more computing devices. In some examples, a training module 602 can be implemented by a different device than a prediction module 604. In these examples, the trained model 614 can be created on a first machine and then sent to a second machine. For example, the training can be performed in a server device, e.g., "in the cloud", and then the trained model can be sent to another device, such as a PC.

The machine learning module 600 utilizes a training module 602 and a prediction module 604. The prediction module 604 is an example of a trained machine learning model, such as the previously trained machine learning models 302 (of FIG. 3A), 322 (of FIG. 3B), 406 (of FIGS. 4), and 420 (of FIG. 5). The training module 602 can implement a computerized method of training processing circuitry, such as the processor 702 of FIG. 7, using machine learning in a system for non-destructive testing (NDT) of a material to reconstruct higher dimension decoded first acoustic imaging data, e.g., reconstructed FMC data, from a lower dimension encoded acoustic image, e.g., a TFM image, using one or more generation parameters, such as shown and described above with respect to FIG. 2.

The training data 606 can be formatted using a pre-processing module 608.

The training data 606 can include, for example, acoustic data, e.g., FMC data, and its corresponding encoded acoustic image, e.g., TFM image. In some examples, a processor, such as the processor 702 of FIG. 7, can compute a plurality of encoded acoustic images, e.g., TFM images, by applying different generation parameters to the same set of acoustic data, e.g., FMC data. In this manner, the processor can generate a large set of training data. Using this training data, the machine learning model in training 610 can be trained to go from an encoded acoustic image, e.g., TFM image, to a prediction output 612 that includes reconstructed acoustic data, e.g., reconstructed FMC data.

In some implementations, it can be expensive and/or cumbersome to collect experimental data for training a machine learning model. Instead, simulation tools can generate numerous quantities of simulated acoustic data and images that can be used for the training. For this reason, in some examples, the training data 606 can include at least some simulation training data. In some examples, simulated and experimental data can be included in the training data 606 set prior to the model training.

During training, the training module 602 can compare the training data 606 and the prediction output 612 and generate an error function 615 based on the comparison. In some examples, the training module 602 can update the model in training 610 in response to the error function 615, such as by using backpropagation module 616.

In the prediction module 604, the data 618 can be input and pre-processed using a pre-processing module 620 to format the data prior to sending to the trained model 614. For example, the data 618 can be a matrix representing a 2D image and the pre-processing module 620 can 'flatten' that data 618 into a 1D array prior to sending to the trained model 614. The data 618 can include the first encoded acoustic image, e.g., TFM image, one or more inspection parameters, one or more generation parameters, and optionally downsampled acoustic data, e.g., phase data. The pre-processing module 620 generates a formatted data, which is input into the trained model 614 to generate an output 622 that is either reconstructed acoustic imaging data, such as reconstructed acoustic imaging data 310, 328, 410, and 418, or directly a second encoded acoustic image. In some implementations, the pre-processing module 608 and the pre-processing module 620 can be the same module.

As mentioned above, in some examples, a downsampled acoustic data can be used with an encoded acoustic image, e.g., TFM image, in order to increase the quantity of information available. In some examples, the training module 602 can be trained using the downsampled acoustic data using techniques such as interpolation.

In some examples, the downsampled acoustic data can include phase data only, and no amplitude data. The training module 602 can be trained to generate amplitude data from the phase data and an first encoded acoustic image and then map the amplitude data to the phase data to generate reconstructed acoustic data, e.g., FMC data, as a prediction output 612.

The machine learning model in training 610 can be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

In this manner, the machine learning module 600 of FIG. 6 can assist in implementing a computerized method of image processing using processing circuitry to apply a previously trained machine learning model in a system for non-destructive testing (NDT) of a material, in accordance with this disclosure.

The techniques shown and described in this document can be performed using a portion or an entirety of an inspection system 100 as shown in FIG. 1 or otherwise using a machine 700 as discussed below in relation to FIG. 7.

Figure 7:
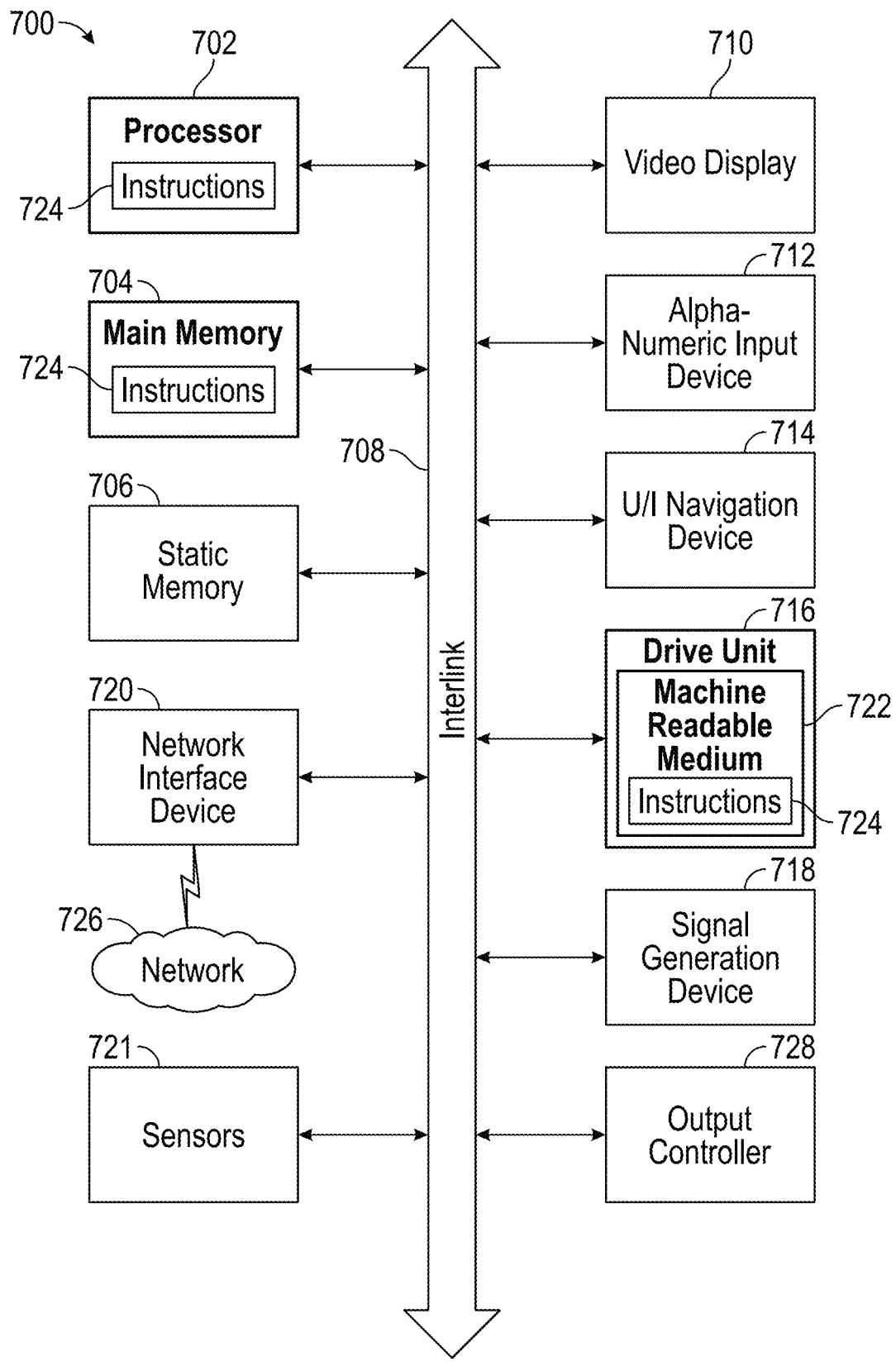
FIG. 7 illustrates a block diagram of an example of a machine upon which any one or more of the techniques (e.g., methodologies) discussed herein can perform.

FIG. 7 illustrates a block diagram of an example of a machine upon which any one or more of the techniques (e.g., methodologies) discussed herein can perform. In alternative embodiments, the machine 700 can operate as a standalone device or are connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 700 can perform one or more of the processes described above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software can reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Machine (e.g., computer system) 700 can include a hardware processor 702 (e.g., a central processing unit (CPU), a graphics processing unit (GPU), a hardware processor core, or any combination thereof), a main memory 704, and a static memory 706, some or all of which can communicate with each other via an interlink 708 (e.g., bus). The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 are a touch screen display. The machine 700 can additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 can include a machine readable medium 722 on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 can constitute machine readable media.

While the machine readable medium 722 is illustrated as a single medium, the term "machine readable medium" can include a single medium or multiple media (e.g., a centralized or distributed database, and/or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media can include non-transitory machine-readable media. In some examples, machine readable media can include machine readable media that is not a transitory propagating signal.

The instructions 724 can further be transmitted or received over a communications network 726 using a transmission medium via the network interface device 720. The machine 700 can communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, a Long Term Evolution (LTE) family of standards, a Universal Mobile Telecommunications System (UMTS) family of standards, peer-to-peer (P2P) networks, among others.

In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. In some examples, the network interface device 720 can wirelessly communicate using Multiple User MIMO techniques.

Examples, as described herein, can include, or can operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Various embodiments are implemented fully or partially in software and/or firmware. This software and/or firmware can take the form of instructions contained in or on a non-transitory computer-readable storage medium. Those instructions can then be read and executed by one or more processors to enable performance of the operations described herein. The instructions are in any suitable form, such as but not limited to source code, compiled code, interpreted code, executable code, static code, dynamic code, and the like. Such a computer-readable medium can include any tangible non-transitory medium for storing information in a form readable by one or more computers, such as but not limited to read only memory (ROM); random access memory (RAM); magnetic disk storage media; optical storage media; flash memory; etc.

NOTES

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced.

These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A computerized method of image processing using processing circuitry to apply a previously trained decoder machine learning model in a system for non-destructive testing (NDT) of a material, the method comprising:
   obtaining a first encoded acoustic image of an object, wherein the first encoded acoustic image is generated using raw acoustic data and at least one generation parameter and at least one inspection parameter, wherein the at least one generation parameter includes at least one of wedge velocity, wedge angle, wedge first elements height, wedge radius, part velocity, part thickness, and selected acoustic mode;
   applying a previously trained decoder machine learning model to the first encoded acoustic image to generate reconstructed raw acoustic data;
   modifying the at least one generation parameter; and
   applying the modified at least one generation parameter and the reconstructed raw acoustic data to an encoder to generate a second encoded acoustic image of the object.

2. The computerized method of claim 1, comprising:
   performing acoustic acquisition techniques to obtain the raw acoustic data.

3. The computerized method of claim 2, wherein performing acoustic acquisition techniques to obtain the raw acoustic data includes:
   performing full matrix capture techniques to obtain the raw acoustic data.

4. The computerized method of claim 2, wherein performing acoustic acquisition techniques to obtain the raw acoustic data includes:
   performing virtual source aperture techniques to obtain the raw acoustic data.

5. The computerized method of claim 1, wherein the first encoded acoustic image is generated using a total focusing method (TFM) technique.

6. The computerized method of claim 1, wherein the first encoded acoustic image is generated using a synthetic aperture focusing technique (SAFT).

7. The computerized method of claim 1, comprising:
   selecting the previously trained decoder machine learning model from a plurality of previously trained decoder machine learning models.

8. The computerized method of claim 7, wherein the plurality of previously trained decoder machine learning models were trained using different generation parameters.

9. The computerized method of claim 1, wherein both the first encoded acoustic image and the raw acoustic data include three-dimensional (3D) data.

10. A computerized method of image processing using image processing circuitry to apply a previously trained decoder machine learning model in a system for non-destructive testing (NDT) of a material, the method comprising:
    obtaining a first encoded acoustic image of an object, wherein the first encoded acoustic image is generated using raw acoustic data and at least one generation parameter and at least one inspection parameter, wherein the at least one generation parameter includes at least one of wedge velocity, wedge angle, wedge first elements height, wedge radius, part velocity, part thickness, and selected acoustic mode;
    modifying the at least one generation parameter; and
    applying a previously trained decoder machine learning model to the first encoded acoustic image to generate a second encoded acoustic image using reconstructed raw acoustic data.

11. The computerized method of claim 10, comprising:
    performing acoustic acquisition techniques to obtain the first acoustic imaging data.

12. The computerized method of claim 11, wherein performing acoustic acquisition techniques to obtain the raw acoustic data includes:
    performing full matrix capture techniques to obtain the raw acoustic data.

13. The computerized method of claim 11, wherein performing acoustic acquisition techniques to obtain the raw acoustic data includes:
    performing virtual source aperture techniques to obtain the raw acoustic data.

14. The computerized method of claim 10, wherein the first encoded acoustic image is generated using a total focusing method (TFM) technique.

15. The computerized method of claim 10, wherein the first encoded acoustic image is generated using a synthetic aperture focusing technique (SAFT).

16. The computerized method of claim 10, wherein both the first encoded acoustic image and the raw acoustic data include three-dimensional (3D) data.

17. A computerized method of image processing using image processing circuitry to apply a previously trained decoder machine learning model in a system for non-destructive testing (NDT) of a material, the method comprising:
    obtaining a first encoded acoustic image of an object, wherein the first encoded acoustic image is generated using raw acoustic data and at least one generation parameter and at least one inspection parameter, wherein the at least one generation parameter includes at least one of wedge velocity, wedge angle, wedge first elements height, wedge radius, part velocity, part thickness, and selected acoustic mode;
    downsampling the first raw acoustic data and storing the downsampled raw acoustic data;
    applying a previously trained decoder machine learning model to the downsampled raw acoustic data and the first encoded acoustic image to generate reconstructed raw acoustic data;

modifying at least one generation parameter; and applying the modified at least one generation parameter and the reconstructed raw acoustic data to an encoder to generate a second encoded acoustic image of the object.

18. The computerized method of claim 17, wherein downsampling the raw acoustic data and storing the downsampled raw acoustic data includes:

removing amplitude information of the raw acoustic data and storing phase information of the raw acoustic data.

* * * * *

UNITED STATES PATENT AND TRADEMARK OFFICE
CERTIFICATE OF CORRECTION

| | | |
|---|---|---|
| PATENT NO. | : 12,153,132 B2 | Page 1 of 1 |
| APPLICATION NO. | : 17/447477 | |
| DATED | : November 26, 2024 | |
| INVENTOR(S) | : Badeau et al. | |

It is certified that error appears in the above-identified patent and that said Letters Patent is hereby corrected as shown below:

In the Claims

In Column 18, Line 62, in Claim 17, before "raw", delete "first"

Signed and Sealed this
Twelfth Day of August, 2025

Coke Morgan Stewart
*Acting Director of the United States Patent and Trademark Office*